Figure 1:
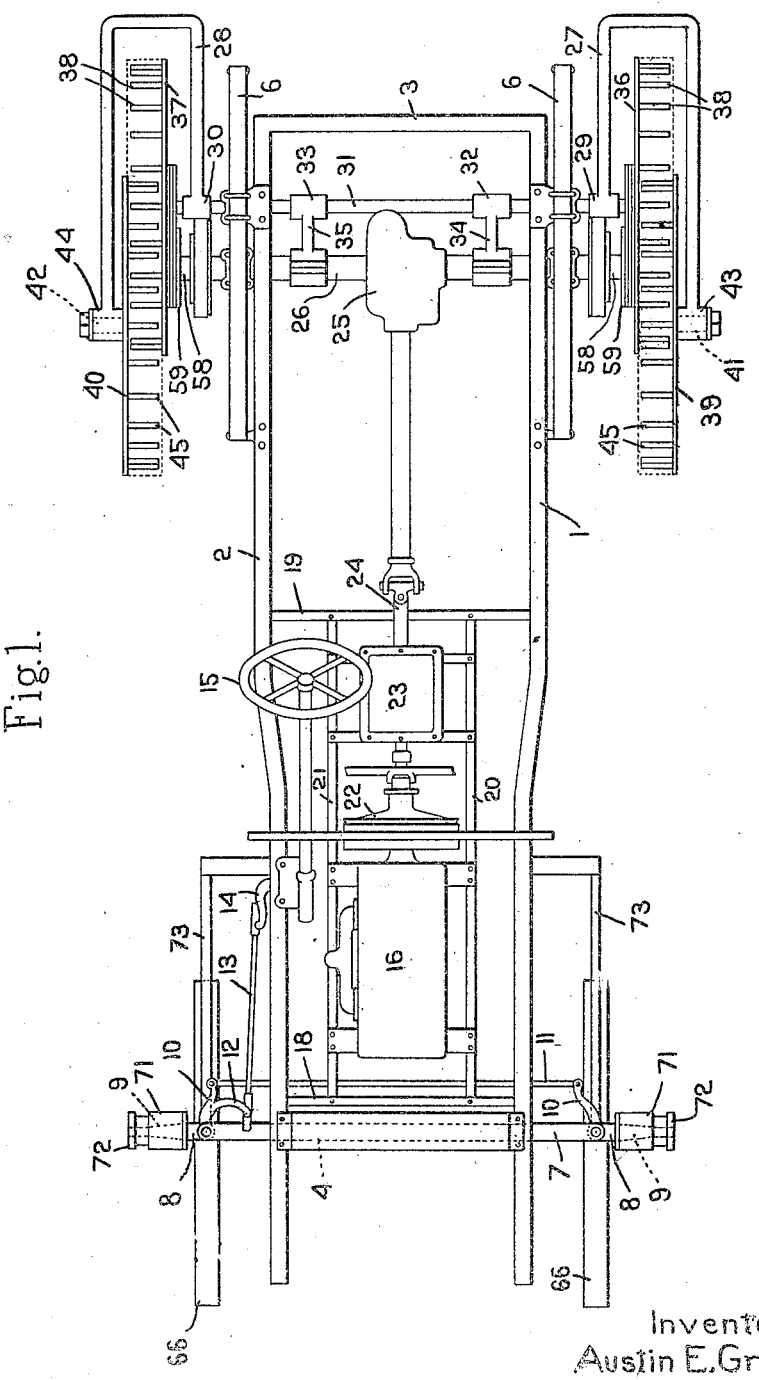

A. E. GREEN.
AUTOMOBILE DRIVE.
APPLICATION FILED MAY 21, 1918.

1,293,757.

Patented Feb. 11, 1919.
2 SHEETS—SHEET 1.

Inventor.
Austin E. Green
by Heard Smith & Tennent.
Attys.

A. E. GREEN.
AUTOMOBILE DRIVE.
APPLICATION FILED MAY 21, 1918.
1,293,757.
Patented Feb. 11, 1919.
2 SHEETS—SHEET 2.
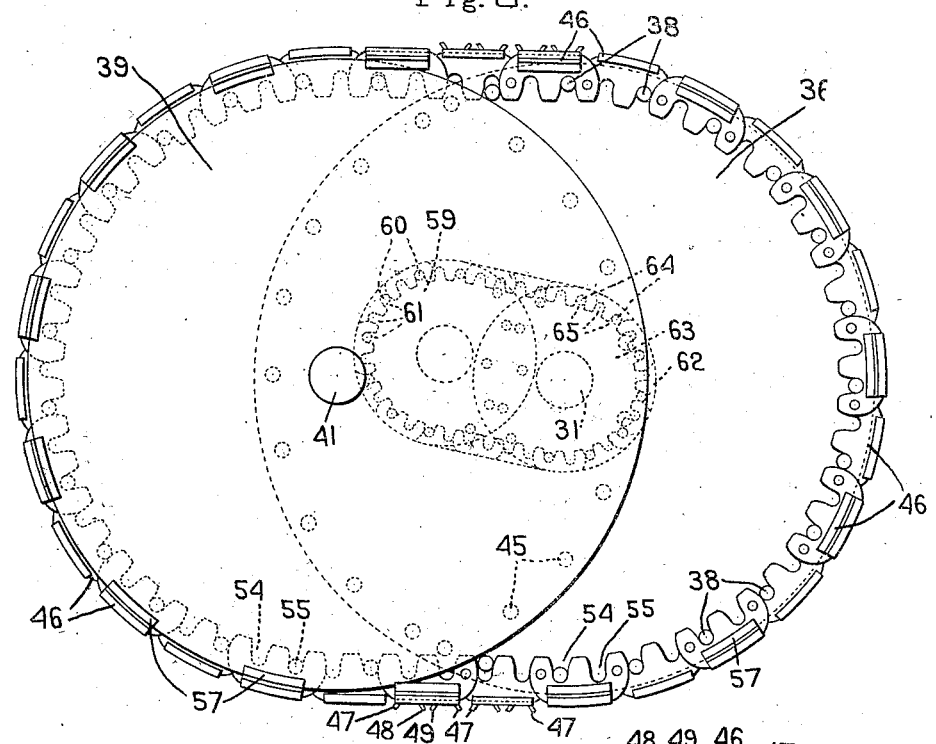
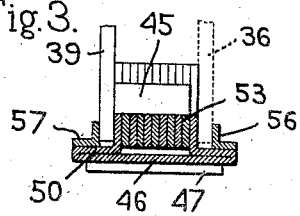
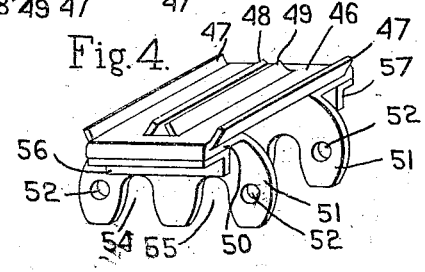
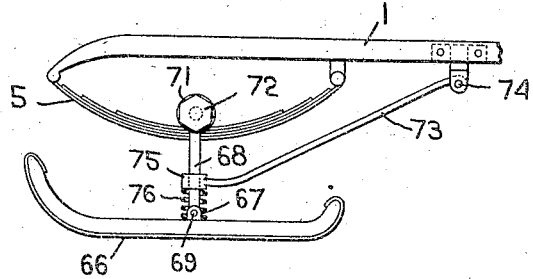
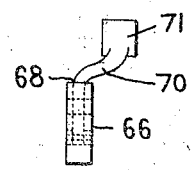
Inventor.
Austin E. Green
by Heard Smith & Tennant
Attys.

UNITED STATES PATENT OFFICE.

AUSTIN E. GREEN, OF EASTON, MAINE.

AUTOMOBILE-DRIVE.

1,293,757.  Specification of Letters Patent.  Patented Feb. 11, 1919.

Application filed May 31, 1918. Serial No. 235,809.

*To all whom it may concern:*

Be it known that I, AUSTIN E. GREEN, a subject of the King of Great Britain, and resident of Easton, county of Aroostook, State of Maine, have invented an Improvement in Automobile-Drives, of which the following description, in connection with the accompanying drawing, is a specification, like characters on the drawing representing like parts.

This invention relates to improvements in motor propelled vehicles and the principal object of the invention is to provide means whereby an automobile of the usual type may be adapted to be run upon snow and ice so that the machine may be used in winter as well as in summer.

This is accomplished in the preferred form of the invention illustrated herein by providing a caterpillar traction mechanism which may be substituted for the rear driving wheels of the automobile and preferably also by providing runner mechanism which may be substituted for the front or steering wheels of the automobile, said runners desirably being adapted to be placed upon the front axle skeins and so constructed that the same steering mechanism may be operated to guide the runners as is used to guide the usual front wheels.

I am aware that heretofore various traction means have been designed to enable automobiles to be driven upon ice and snow, such means usually being gripping members or rims having gripping plates applied to the rear wheels of the automobile. I am also aware that it has heretofore been proposed to substitute caterpillar traction mechanism for the rear wheels of the automobile for this purpose but the wheels of such caterpillar traction mechanisms if made of substantially the size of the usual wheels of the automobile occupy so great a space alongside of the machine as to make the same cumbersome and difficult to drive, whereas if smaller wheels are used in the caterpillar traction mechanism it is quite impossible to drive the caterpillar chain with sufficient speed to enable the automobile to progress over the ground with desirable rapidity.

Another object of the present invention therefore, is to provide a caterpillar traction mechanism of a compact character in which wheels of substantially the same diameter as the usual wheels of the automobile may be utilized and in which a sufficient amount of tread surface may be obtained to provide for the proper propelling of the vehicle without occupying an undesirable amount of space or interfering with the proper guiding of the machine.

This is accomplished in the present invention by providing rotatable members operable from the rear or driving axle of the automobile, said members being located in such proximity that their peripheries overlap each other, means being provided for properly actuating a traction chain having suitable ribs, flanges or projections to engage the snow or ice in such a manner as to propel the vehicle properly.

Another feature of the invention consists in providing the rotatable members which have their peripheries overlapping with means for actuating a suitable traction chain, the chain engaging means of one disk being adapted to pass between the chain engaging means of the other disk.

Another feature of the invention consists in the production of a special form of traction chain adapted to be applied to the overlapping rotatable members.

A further object of the invention is to provide a driving gearing for said rotatable members in which the driving and driven members may be set so closely together that their peripheries will overlap with a chain passing around said members adapted to transmit rotation from one to the other.

More broadly the object of the invention consists in the production of power transmitting mechanism comprising two rotatable members so positioned that their peripheries overlap with an endless chain surrounding the same adapted to transmit rotative movement from one to the other. It also comprises broadly the production of caterpillar traction mechanism comprising a pair of rotatable members and an endless traction chain mounted thereon having a tread less than the combined length of the radii of the combined members.

A further object of the invention is to provide a special form of runner or shoe which can be mounted upon the axle skein of a usual steering knuckle and in which the longitudinal vertical median plane will be co-incident with the axis of the pivot of the steering knuckle whereby the shoe may be turned to guide the vehicle without imposing the amount of strain upon the shoe which would occur if the shoe were moved through an arc about the axis of the steering knuckle. Furthermore, by this construction a more sensitive and positive control of the steering mechanism is produced.

Other objects and features of the invention will more fully appear from the following description and accompanying drawings and will be pointed out in the annexed claims.

The drawings illustrate a preferred embodiment of my invention as applied to the chassis of an automobile to adapt the same to be driven on ice or snow, it being understood however that the broad principles embodied in the traction mechanism disclosed herein may be used in connection with any other type of traction or power transmitting mechanism.

In the drawings,

Figure 1 is a plan view of the chassis of an automobile with my invention applied thereto, Fig. 2 is a detail side view of the rotatable members having their peripheries overlapping and carrying an endless traction chain, said view also illustrates a preferred form of novel driving mechanism for rotating one of said members from the main shaft of the automobile, Fig. 3 is a vertical sectional view of the sprocket chain showing its relation to the rotatable members upon which it is mounted.

Fig. 4 is a perspective view of a preferred form of link for the traction chain, Fig. 5 is a detail side elevation of a portion of the front end of the frame and springs of an automobile showing a runner embodying my invention substituted for the usual steering wheel, Fig. 6 is a front elevation of a preferred form of runner and bracket adapted to be substituted for the front wheel of an automobile.

The invention is illustrated herein as applied to a typical automobile chassis comprising a main frame having longitudinally extending side bars 1, 2, connected by end bars 3, 4 and having usual front springs 5 and rear springs 6. The front axle 7 is rigidly supported by the front springs 5 and is provided at its ends with steering knuckles 8 having usual outwardly extending skeins 9 also having arms 10 connected to a radius bar 11. One of said steering knuckles has an arm 12 which is connected by a link 13 to an arm 14 which is operated by the steering wheel 15 in the usual manner.

The engine or motor 16 is mounted upon a sub-frame comprising end members 18, 19 secured to the side frame members 1 and 2 and connected to each other by longitudinally extending girders 20, 21. A usual clutch 22, transmission 23 and driving shaft 24 is provided for driving the rear axle through the usual differential mechanism contained in a differential case 25 which is carried by or forms part of a rigid dead axle 26 in which a rotating driving axle is journaled, said driving axle being actuated through the differential as is customary in machines of this type.

The mechanism thus briefly described may be of any suitable form in which power is transmitted from a suitable motor to the driving axle of the vehicle, whether the same be driven through the rear axle as is usual in automobile construction or by special mechanism through the front axle.

The principal feature of the present invention consists in providing a caterpillar traction means which may be substituted for the usual driving wheels of a vehicle to afford a sufficient gripping surface to insure proper propulsion of the vehicle upon ice and snow; which will neither occupy too great a space alongside the vehicle nor interfere with the proper steering thereof and which will enable the vehicle to be driven at substantially the same speed as when supported upon wheels and driven upon a solid road.

The mechanism for accomplishing this purpose, a preferred form of which is illustrated herein, comprises a pair of substantially U-shaped frame members 27, 28 having journals 29, 30 for a supplemental shaft 31 which serves to connect said U-shaped members 27. The shaft 31 is journaled in bearings 32, 33 upon brackets 34, 35 which are clamped or otherwise secured to the dead axle 26. Rotatable members, preferably in the form of disks 36, 37 are mounted upon the ends of the supplemental axle 31, said disks being provided with chain engaging members preferably in the form of pins 38 projecting outwardly therefrom. Complementary rotatable members 39, 40 are journaled upon stub shafts 41, 42 projecting from bosses 43, 44 upon the frames 27, 28. Chain engaging members preferably in the form of pins 45 project inwardly from the rotatable members 39, and 40 and coöperate with the pins 38 upon the rotatable members 36, 37 to support and drive the traction chain.

By proper construction the rotatable members and their pins may be so proportioned that the axes of said rotatable members may be placed at such distance apart as to give the desired tread to the traction chain, the peripheries of said rotatable members overlapping each other and the chain engaging members or pins of one disk passing between the chain engaging members or pins of the complementary disk.

By reason of this construction a caterpillar tread may be provided which will have a ground gripping surface, less than the combined length of the radii of the rotatable members, thus providing sufficient gripping area to insure the proper propulsion of the machine at a high speed without taking up an undesirable distance along the side of the frame of the machine or producing so long a tread surface as to interfere with the steering of the machine.

Any suitable traction chain may be used. A desirable form which is illustrated herein comprises a series of links 46 which, as illustrated in Fig. 4, are constructed of sheet metal in the form of plates having upturned edges 47 to provide gripping calks. Additional calks 48, 49 may be formed by slitting the longitudinal central portion of the plate and turning the edges of the slit upwardly as illustrated.

The plates 46 are provided with extended end portions, parts 50 of which are bent back sharply against the reverse side of the plate, the remainder of said end portions being bent downwardly as flanges 51, these flanges are provided with apertures 52 to receive pins which connect the adjacent links to each other to form a chain, the space between the flanges 52 being filled with spacing links 53 as illustrated in Fig. 3. The flanges 51 are provided with driving teeth the recesses 54, 55 between which are adapted to receive the pins 38 and 45 of the rotatable members 36—37 and 39—40.

Preferably the pins 38 of one pair of rotatable members or disks always engage the recesses 54 of the links 46 while the pins 45 upon the other rotatable member or disk engage the recesses 55 of the links 46. This construction insures the maintenance of the chain engaging members or pins in proper relation at all times and an effective driving of the chains. The links 46 preferably are also provided with guide plates 56, 57 which are welded, riveted or otherwise secured to the ends of the links to provide a guideway for the peripheries of the disks 36—37 and 39—40 respectively, these flanges serving to prevent the chain from working off during the rapid rotation of the rotatable members.

The rotatable members 36—37 may be driven from the driving axle of the automobile in any desired manner. As illustrated herein a driving mechanism similar to that for supporting and actuating the traction chain is provided. The hubs 58 of the gearing members 59 are rigidly secured upon the driving shaft, which is illustrated herein as the rear live axle. These gearing members preferably comprise disks having a series of pins 60 projecting laterally therefrom and adapted to engage recesses 61 in links 62 of a chain similar to the links of the traction chain but without having the calks or lateral guides. The complementary gearing members 63 are rigidly secured upon the supplemental axles 31 and are provided near their peripheries with pins 64 adapted to engage the recesses 65 in the links 62 of said driving chain. These disks with laterally projecting pins act in effect as sprocket wheels but the locations of the wheels are such that the disks may be located in sufficient proximity to permit their peripheries to overlap. In such case the pins upon one disk pass between the pins upon the other disk as above described.

A further feature of the invention comprises the substitution of runners or shoes for the front wheels of the automobile, said shoes being adapted to steer the machine in the same way as the front wheels of the usual automobile.

As disclosed herein the shoes comprise runners 66 having upwardly extending bosses 67 to which brackets 68 are pivotally secured by pins or bolts 69. The brackets are provided with laterally offset portions 70 and at their upper ends terminate in hubs 71 adapted to fit and be secured upon the skeins 9 of the steering knuckles 8. The hubs 71 are secured upon said skeins by the usual nuts 72. The brackets 68 are sufficiently offset to cause the vertical longitudinal median plane of the runners 66 to be coincident with the vertical axes of the steering knuckles so that the runners when turned will swing about a point directly under the axis of the steering knuckle and not through the arc of a circle.

In order to maintain the bracket 68 in vertical position brace rods 73 are provided which are pivotally secured at one end to brackets 74 and at the other end provided with bosses 75 which embrace vertical cylindrical portions of the brackets 68. Springs 76 resting upon the runners 66 and abutting at their upper ends against the under faces of the bosses 75 serve to retain the rods 73 in proper position and also to permit free flexible movement between the lower ends of the brackets 68 and the runners 66.

In order to transform an ordinary automobile into a motor propelled vehicle for use upon ice and snow it is therefore merely necessary to remove the rear wheels from their axles and to secure the driving members 59 upon said axle. The supplemental frame may then be secured by the bracket 34—35 to the dead axle 26, the rotatable traction members and traction chains being of course carried by said supplemental frame. The chains 62 will then be placed upon the driving members 59 and the complementary members 63 and the automobile will be fully equipped with the caterpillar traction drive.

By removing the front wheels of the automobile and slipping the hubs 71 of the brackets 68 upon the skeins of the steering mechanism and then connecting the rods 73 to the brackets 74 upon the frame, the motor propelled snow and ice vehicle will be complete.

It is to be understood that the traction mechanism illustrated herein is not designed merely for the purpose of use in the propulsion of automobiles upon snow and ice but that it is of general utility and may be employed in any place in which it is desirable to preserve the size of two or more rotatable members and still have them support and actuate an endless chain.

It will be understood that while disks having pins projecting laterally near their peripheries are illustrated herein and referred to as disks in the foregoing description the term disk is intended to be of sufficiently broad scope to cover wheels of any character or diameter or any other rotatable member which is adapted to support and properly to engage a driving or a traction chain such as defined by the following claims.

The embodiment of the invention disclosed herein is illustrative in character and not restrictive and various modifications may be made within the spirit and scope of the following claims.

Having thus described my invention what I claim as new and desire to secure by Letters Patent is;

1. A traction attachment for automobiles comprising a frame adapted to be secured to the chassis of the automobile, carrying a pair of caterpillar tractors, each consisting of a pair of overlapping rotatable members of substantially the same diameter as the original driving wheels of the automobile, having an endless chain mounted thereon, the shafts of said rotatable members being in such proximity that the tread of said traction chain is less than the combined length of the radii of said rotatable members, and means for driving said rotatable members from the driving axle of the automobile.

2. A traction attachment for automobiles comprising a frame adapted to be secured to the chassis of the automobile, carrying a pair of caterpillar tractors each consisting of a pair of overlapping rotatable members of substantially the same diameter as the original driving wheels of the automobile, having laterally extending chain engaging members, an endless traction chain mounted thereon provided with teeth engaging said chain engaging members, the shafts of said rotatable members being in such proximity that the tread of said traction chain is less than the combined length of the radii of said rotatable members and means for driving said rotatable members from the driving axle of the automobile.

3. A traction attachment for automobiles comprising a supplementary frame adapted to be secured to the chassis of the automobile, a pair of shafts journaled in said supplemental frame, rotatable members having their peripheries overlapping mounted upon said shafts, an endless traction chain mounted upon said rotatable members and means independent of said traction chain for rotating said rotatable members from the driving axle of the automobile.

4. Caterpillar traction mechanism comprising an endless traction chain, a pair of rotatable members for supporting and actuating said chain having means engaging said traction chain, the axes of the rotatable members being placed in such proximity that the chain engaging means of each of said rotatable members will pass between the chain-engaging means of the other rotatable member.

5. Caterpillar traction mechanism comprising a frame, rotatable members mounted on said frame having their peripheries overlapping each other and an endless traction chain, having driving teeth, mounted upon the peripheries of each of said rotatable members, means upon said rotatable members engaging the teeth of said chain and means for rotating one of said rotatable members.

6. Caterpillar traction mechanism comprising a frame, a pair of rotatable members mounted upon said frame and having their peripheries overlapping each other, pins located adjacent the peripheries of each of said rotatable members, the pins upon each rotatable member extending toward the other rotatable member and adapted to pass between the pins upon the latter upon the rotation of said rotatable members, an endless traction chain comprising links having means for engaging the pins upon said rotatable members and means for rotating one of said rotatable members.

7. Caterpillar traction mechanism comprising a frame, a pair of rotatable members mounted upon said frame and having their peripheries overlapping each other, pins located adjacent the peripheries of each of said rotatable members, the pins upon each rotatable member extending toward the other rotatable member and adapted to pass between the pins upon the latter upon the rotation of said rotatable members, an endless traction chain comprising links having means for engaging the pins upon said rotatable members and guides to embrace the peripheries of said rotatable members and means for rotating one of said rotatable members.

8. Traction mechanism comprising a driving shaft, a frame, a pair of supplemental shafts journaled therein, a pair of rotatable members mounted respectively upon said supplemental shafts and having their peripheries overlapping, pins projecting from each of said rotatable members toward the other rotatable member and adapted to pass between the pins upon the latter upon the rotation of said rotatable members, an endless traction chain having links provided with means to engage said pins, means for driving one of said supplemental shafts from said driving shaft thereby to rotate said rotatable members.

9. Traction mechanism comprising a driving shaft, a frame, a pair of supplemental shafts journaled therein, a pair of rotatable members mounted respectively upon said supplemental shafts and having their peripheries overlapping, pins projecting from each of said rotatable members toward the other rotatable member and adapted to pass between the pins upon the latter upon the rotation of said rotatable members, an endless traction chain having links provided with means to engage said pins, means for driving one of said supplemental shafts from said driving shaft comprising a pair of overlapping rotatable members having pins located within the periphery of each rotatable member and extending toward the other rotatable member and an endless chain having links engaging the pins upon said rotatable members.

10. Caterpillar traction mechanism comprising a frame, rotatable members mounted upon said frame having their peripheries overlapping each other, pins located adjacent the peripheries of said rotatable members, the pins upon each member extending toward the other member and adapted to pass between the pins on the latter upon the rotation of said members, an endless traction chain having pin receiving recesses positioned to engage alterately the pins of the respective rotatable members.

11. Caterpillar traction mechanism comprising a frame, rotatable members mounted upon said frame having their peripheries overlapping each other, pins located adjacent the peripheries of said rotatable members, the pins upon each member extending toward the other member and adapted to pass between the pins on the latter upon the rotation of said members, an endless traction chain comprising links, each having two pin receiving recesses, one of said recesses being positioned to engage the pins of one of said rotatable members and the other recess to engage the pins of the other rotatable member.

12. An endless traction chain comprising a series of links consisting of plates having upon one side projecting gripping surfaces and upon the other side flanges pivotally connected together at their ends and having recesses to receive pins upon a rotatable member, guides extending in parallelism with said flanges adapted in coöperation with said flanges to embrace the periphery of the rotatable members.

13. A link for a traction chain comprising a plate of sheet metal having projecting instrumentalities to provide a traction surface, the ends of said plates being folded in upon the body of the plate and bent downwardly to form flanges, alined pivot receiving apertures in said flanges adjacent the ends thereof, recesses in said flanges intermediate their ends adapted to receive driving members and guide plates secured to the folded end portions of said plate extending in parallelism with said flanges and spaced apart therefrom to provide a guideway for the periphery of rotatable members to which the traction chain is applied.

14. A link for a traction chain comprising a plate having on one side a gripping surface and upon the opposite side flanges projecting normally thereto provided with alined apertures to receive pivotal means for connecting adjacent links, guiding means secured to said plate extending in parallelism with said flanges but spaced apart therefrom to form guideways for the periphery of a rotatable member upon which the chain is mounted.

In testimony whereof, I have signed my name to this specification.

AUSTIN E. GREEN.